Figure 1:
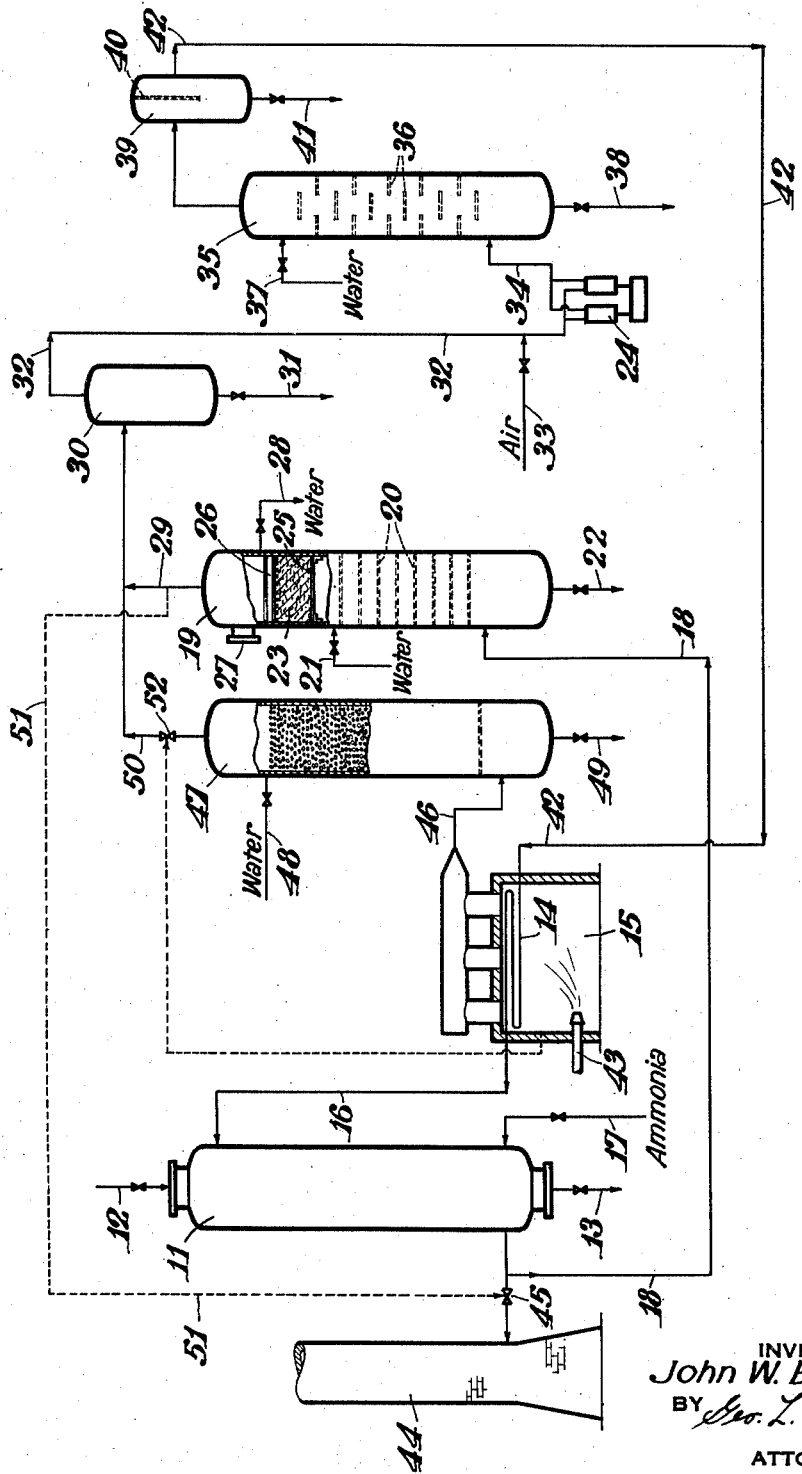

Sept. 24, 1940.  J. W. BERTETTI  2,215,868
CATALYST REVIVIFICATION
Filed Oct. 18, 1937   2 Sheets-Sheet 1

INVENTOR
John W. Bertetti
BY Geo. L. Parkhurst
ATTORNEY

Sept. 24, 1940.  J. W. BERTETTI  2,215,868
CATALYST REVIVIFICATION
Filed Oct. 18, 1937   2 Sheets-Sheet 2

INVENTOR
John W. Bertetti
BY
ATTORNEY

Patented Sept. 24, 1940

2,215,868

UNITED STATES PATENT OFFICE 2,215,868

CATALYST REVIVIFICATION

John W. Bertetti, Galveston, Tex., assignor to Pan American Refining Corporation, New York, N. Y., a corporation of Delaware Application October 18, 1937, Serial No. 169,661

6 Claims. (Cl. 252—242)

This invention relates to means and methods for catalyst revivification. More particularly it relates to systems wherein a catalyst is revivified by means of a gas which is compressed and recycled and in which a filter is used to remove a fog.

In many catalytic processes a liquid, or more commonly a solid, catalyst is revivified by blowing with a suitable gas, usually air or a gas containing air. Thus, for instance, in the catalytic polymerization of olefins to hydrocarbons of the gasoline boiling range a so-called solid phosphoric acid catalyst (phosphoric acid adsorbed on a support such as clay) is frequently used. This catalyst becomes inactive in time due largely to the deposition of coke-like material. This is removed and the catalyst is revivified by blowing with hot flue gases containing a controlled minor amount of air or oxygen so that sintering of the catalyst is avoided. It is highly desirable that this gas be recycled in order to reduce the load on the furnace supplying the flue gas. This recycling involves compression and I have found that this is rendered very difficult by a corrosive fog which results in the fouling of the compressors. Many attempts were made to solve the fog problem, for instance water washing, chemical washing, etc., but without success. I have eliminated this fog difficulty by the use of a filter, preferably a cotton filter, between the catalyst chambers and the compressors. All of this will be described in more detail hereinafter.

It is an object of my invention to provide improved means and methods for catalyst revivification. More particularly it is an object of my invention to provide means and methods whereby a revivification gas can be recycled through the compressor or compressors and whereby fouling of the compressors is avoided. Other and more detailed objects of my invention will become apparent as the description thereof proceeds.

Figure 2:
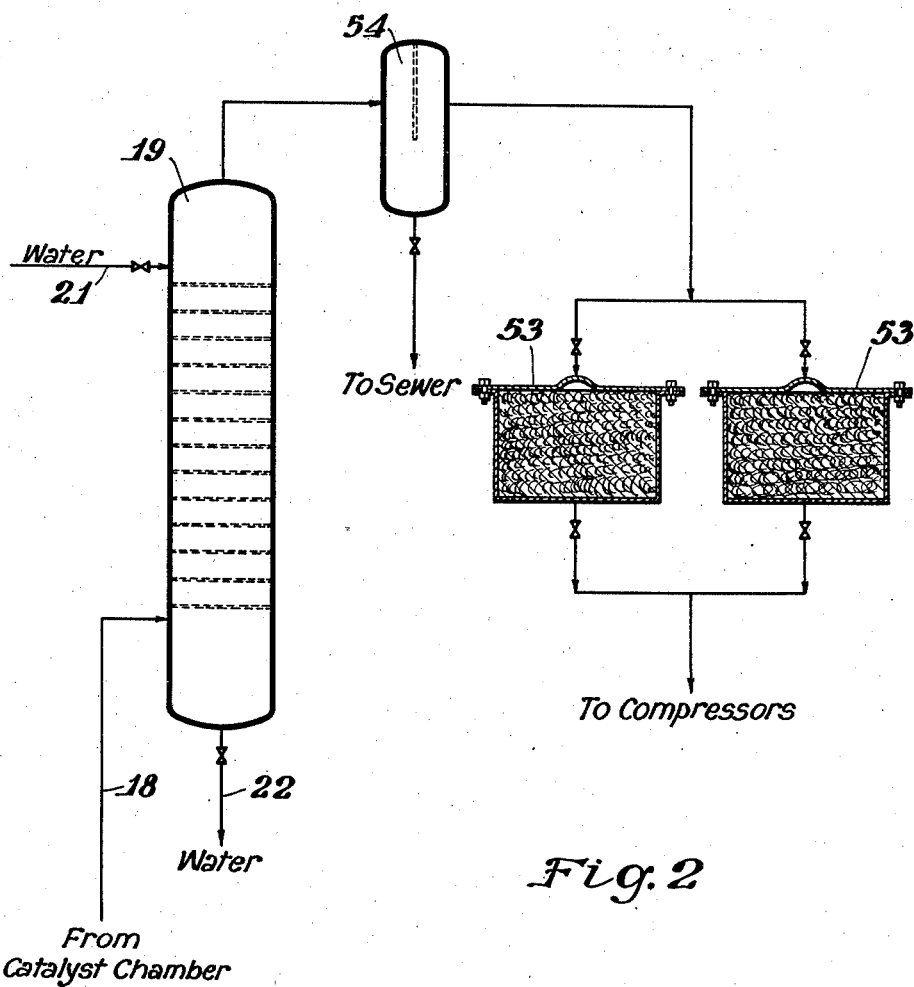

A specific embodiment of my invention will be described with particular reference to the accompanying drawings which form a part of this specification and are to be read in conjunction with it. In the drawings:

Figure 1 is a flow diagram of a catalyst revivification system in accordance with my invention and Figure 2 is a flow diagram showing a modified form of one portion of Figure 1.

Turning now to Figure 1 in more detail, a catalyst tower 11 is provided with a valved inlet 12 for the reacting materials and a valved outlet 13 for the reacted materials. Catalyst tower 11 may, for instance, contain solid phosphoric acid and the material entering through inlet 12 may be olefin-containing gases. In actual practice a plurality of towers arranged in multiple are commonly used so that one or more can be cut out for revivification without interrupting the process. However, since my invention is concerned solely with the revivification only a single tower is shown and the rest of the polymerization system, familiar in the art, is omitted.

The flue gases for revivification are heated in coil 14 of preheater 15 and pass through line 16 to catalyst tower 11. Ammonia is introduced through valved line 17 to limit corrosion. The revivification gas passes out through line 18 to primary scrubber 19 equipped with plates 20. This scrubber is equipped with valved water inlet 21 and valved water outlet 22. The scrubbing cools the gases, which is desirable before compression, and removes some phosphoric acid. The cooling precipitates water dissolved in the gas. However, an extremely tenacious fog is formed. This fog is removed by cotton filter 23.

Originally the system of Figure 1 was used as shown except that cotton filter 23 was not present. It was found that the original system resulted in extremely rapid fouling of compressors 24. The deposit in the compressors was a mixture of iron phosphate, ammonium phosphate and phosphoric acid. The fouling was so serious that only one of the two compressors provided could be used, the other being constantly down for cleaning. Furthermore, the rate of revivification had to be slowed down greatly. Revivification took about 21 days and even then was unsatisfactory. By installing the filter the fog is removed, both compressors can be used, revivification was greatly improved and the revivification time was cut down to 10-12 days. Many other expedients for removing this fog were tried but without success.

Returning to the description of Figure 1 the scrubbed gases pass upward through cotton filter 23. More will be said about the exact nature of this filter hereinafter. The cotton is supported on perforated plate 25 and is held down by screens and beams 26. The cotton is inserted and removed through manhole 27. Water tends to accumulate on top of the cotton and can be removed by means of valved water drain 28.

The gases pass through line 29 to dry drum 30 in which entrained water separates. This is removed periodically through valved drain 31. From dry drum 30 the gases pass through line 32 to compressors 24. A controlled amount of air is admitted through valved inlet 33 on the suction side of the compressors.

From the compressors the gases pass through line 34 to secondary scrubber 35, the principal purpose of which is to cool the gases and thereby precipitate additional water, an excess of water being harmful in the revivification. Scrubber 35 has the usual contact plates 36, inlet 37 and outlet 38. It is followed by mist separator 39 provided with baffle 40 and drain 41. The gases then pass through line 42 to coil 14 of preheater 15 thus completing the recycling operation.

Preheater 15 is preferably of the pressure type and operates on fuel gas and air introduced through burner 43. The flue gas is collected and used to supply make-up gas to the system. This make-up gas, together with the air added through inlet 33, replaces a small amount of gas continuously passed to stack 44 through back pressure regulator valve 45.

In a preferred operation about 15–20% of the total revivification gas passing through tower 11 goes to stack 44. Otherwise stated, about 80–85% is recycled. It will be understood, however, that any desired amount of recycling can be used, for instance 25–95%.

The make-up flue gas passes through line 46 to virgin scrubber 47, the main function of which is to cool the gas and precipitate water. Scrubber 47 is preferably a packed tower as shown. It is equipped with valved water inlet 48 and valved water outlet 49. The scrubbed flue gas passes through line 50, and thence to dry drum 30 and compressors 24.

It is preferred to control the pressure in preheater 15 and the passage of gas to the stack in accordance with pressures in the system. Thus back pressure regulator valve 45 is controlled as shown by dotted line 51 in accordance with the pressure in the line passing out of the primary scrubber and cotton filter tower. As this pressure increases more gas is passed to the stack and vice versa. Similarly, back pressure regulator valve 52 is controlled by the pressure existing in preheater 15. When this pressure rises, more flue gas is admitted and vice versa.

Figure 2 represents an improvement over Figure 1. Two cotton filter drums 53 are arranged in parallel with down flow instead of up flow. This and the use of mist eliminator 54 between primary scrubber 19 and the cotton filters avoid the accumulation of water on top of the filters. The use of two filters in parallel permits the shutting down of either without discontinuing revivification.

The cotton used is the ordinary matted fibrous cotton. A considerable thickness of it must be used. Much experimental work has been done as to the optimum type of bed. The cotton should be fairly tightly packed. A bed 15 to 50 inches thick is preferred. An apparent density of 3 to 9 pounds per cubic foot, preferably about 8 pounds per cubic foot, is desirable.

Complete removal of fog was attained with a bed 21¾ inches in depth and containing 5.84 pounds per cubic foot. The rate of flow was 4000 cubic feet per square foot per hour and the pressure drop was 2.6 pounds per square inch. Removal was also complete at the same rate and pressure drop with a bed 18¾ inches deep and containing 6.3 pounds per cubic foot. The weight of cotton per square foot of cross section was very nearly the same, 10 pounds in each bed.

There is a pronounced tendency for gas to leak about the edges of the cotton filter and this, of course, decreases the filtration efficiency. This can be minimized by careful packing of the cotton at the edges. Leakage can be practically eliminated by coating the wall of the filter with asphalt and then packing the cotton into place before the asphalt solidifies. Other cementing agents can, of course, be used.

I have described my invention with particular reference to the use of cotton and to the revivification of a "solid phosphoric acid" catalyst. It will be understood, however, that this is by way of illustration rather than by way of limitation. Other fibrous filter beds, for instance asbestos, glass wool or mineral wool, can be used and the invention can be applied to the revivification of other catalysts where fog difficulties are encountered, for instance aluminum silicate cracking catalysts, metallic oxide dehydrogenation catalysts such as aluminum chromium and silicon oxides, etc.

It is therefore apparent that my invention is bounded only by the appended claims which should be construed as broadly as the prior art will permit.

I claim:

1. In the process of revivifying a solid acidic catalyst mass upon which is deposited a coke-like material and which contains corrosive acidic material entrainable by hot flue gas passed in contact therewith during burning and which corrosive material so entrained remains as a corrosive acid fog after said hot flue gas is thereafter scrubbed with water, the steps comprising passing a hot flue gas containing controlled amounts of oxygen therethrough to burn off the coke-like material, scrubbing the used flue gas with water, passing said gas through a fibrous filter to remove entrained corrosive matter, compressing the filtered flue gas, heating the filtered flue gas and returning said heated gas with controlled amounts of oxygen to the revivification step.

2. The process of claim 1 further characterized in that the fibrous filter is a cotton filter.

3. In the process of revivifying a solid catalyst mass on which is deposited a coke-like material and in the revivification of which in a cycle involving burning, water scrubbing, compressing, and recycling of flue gas, the flue gas accumulates during burning finely divided corrosive material, which remains in the flue gas after water scrubbing as a difficultly removable suspension, the steps comprising passing a hot flue gas containing controlled amounts of oxygen therethrough to burn off the coke-like material, scrubbing the used flue gas with water, passing said gas through a fibrous filter to remove therefrom the corrosive fog which forms during said scrubbing step, compressing the filtered flue gas, heating the filtered flue gas, and returning said heated gas with controlled amounts of oxygen to the revivification step.

4. The process of claim 3 further characterized in that the fibrous filter is a cotton filter.

5. In the process of revivifying a solid phosphoric acid catalyst mass upon which is deposited a coke-like material, the steps comprising passing a hot flue gas containing controlled amounts of oxygen therethrough to burn off the coke-like material, scrubbing the used flue gas with water, passing said flue gas through a closely packed fibrous filter to remove therefrom the corrosive fog which forms during said scrubbing step, compressing the filtered flue gas, heating the filtered flue gas and returning said heated gas with controlled amounts of oxygen to the revivification step.

6. The process of claim 5 further characterized in that the closely packed fibrous filter is a cotton filter.

JOHN W. BERTETTI.